United States Defensive Publication [19] (H) [11] T101,205

Goulder et al. [43] Nov. 3, 1981

[54] MOLDING PROCESS

[76] Inventors: Gordon K. Goulder, 404 Claymore Dr., Kingsport, Tenn. 37663; Edward R. Hollander, Jr., Rte. 13, 213 Montezuma Rd., Kingsport, Tenn. 37664

[21] Appl. No.: 228,415

[22] Filed: Jan. 26, 1981

[51] Int. Cl.[3] ..... B29C 17/07

[52] U.S. Cl. ..... 264/523; 264/532

[57] ABSTRACT

A process of forming a polyethylene terephthalate container in which the container is biaxially oriented simultaneously with being blow-molded. The container is allowed to remain in the blow mold having a surface temperature between about 150° C. and about 250° C. for a time sufficiently long to result in the container reaching a crystallinity of at least 30% while the pressure is simultaneously maintained above atmosphere inside the container to prevent collapse thereof. The process enhances dimensional stability at temperatures sufficiently high to normally cause shrinkage of the container.

5 Claims, No Sheets Drawing,

6 Pages Specification

The file of this unexamined application may be inspected and copies thereof may be purchased (849 O.G. 1221, Apr. 9, 1968).